March 4, 1924.
L. BROWN
1,485,907
MOTION PICTURE OR CINEMATOGRAPH FILM
Filed April 19, 1921
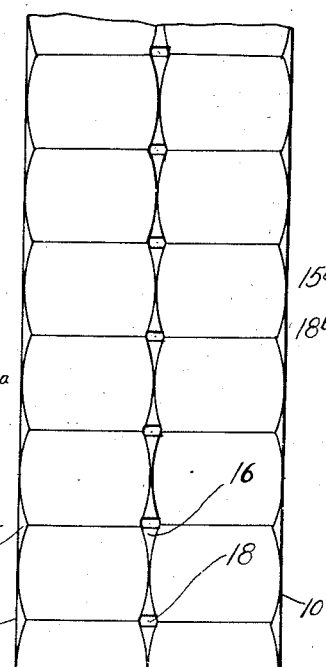
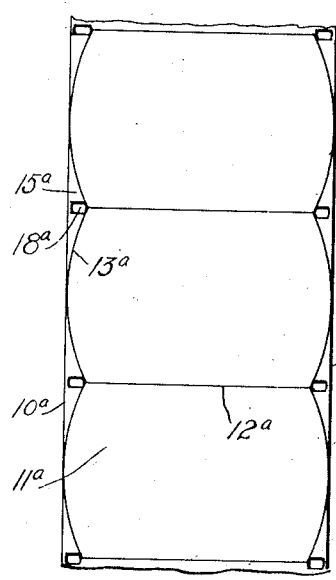
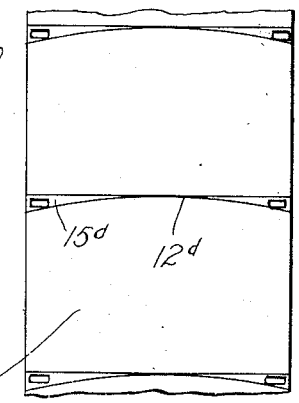
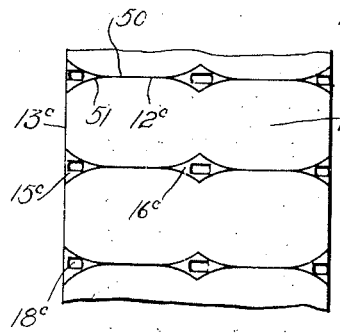
Inventor:
Lloyd Brown.
By James T. Barkelew
his Attorneys Patented Mar. 4, 1924.

1,485,907

UNITED STATES PATENT OFFICE.

LLOYD BROWN, OF LOS ANGELES, CALIFORNIA.

MOTION-PICTURE OR CINEMATOGRAPH FILM.

Application filed April 19, 1921. Serial No. 462,660.

*To all whom it may concern:*

Be it known that I, LLOYD BROWN, a citizen of the United States, residing at Los Angeles, county of Los Angeles, State of California, have invented new and useful Improvements in Motion-Picture or Cinematograph Films, of which the following is a specification.

This invention relates to motion picture or cinematograph film, and it is an object of the invention to provide a film of this character which has a very large picture or image area in proportion to its blank area by which it is carried, and which has blank spaces or areas of such arrangement and extent as to allow it to be handled or carried in a very convenient and effective manner.

A principal object of the invention is to provide a film which has every portion of its area economically utilized and which has a very large proportion of its area utilized for pictures. Cinematograph films have heretofore had one or more longitudinal rows of images or pictures and have had a plurality of continuous longitudinal blank areas or spaces by which they were supported or which were to carry perforations. The shapes of the picture areas heretofore provided have made it necessary to provide a continuous blank space, or spaces, by which to support the film or in which to provide perforations, thus causing the film to have a far greater blank area than is actually necessary for it to be effectively carried or for carrying the necessary perforations. The result has been that cinematograph films heretofore proposed and used have been in varying degrees uneconomical in utilizing space for pictures and have thus been comparatively large, either in width or length or in both, for the size and number of pictures.

The present invention provides a film which has no continuous blank spaces for perforations or by which to be supported, and which has picture areas shaped and arranged so that there are blank areas or spaces, by which the film can be carried and for carrying perforations, economically and effectively shaped, spaced and distributed. The blank areas in the present film are comparatively small and are comparatively few in number, but are arranged and shaped so that the film can be easily and conveniently carried or supported in the necessary manner. The invention provides blank areas by which the film can be supported and which are of such arrangement and extent as to have perforations in them in case it is necessary or desirable to feed or advance the film by a sprocket or claw mechanism or by other means of the general character now used in the art.

The various objects and features of the invention, including those which are herein specifically pointed out or referred to, and also others of note and importance, will be obvious and will be best and more fully understood from the following detailed description of typical embodiments of the invention throughout which reference is had to the accompanying drawings, in which:

Fig. 1 shows a section of cinematograph film embodying the preferred form and arrangement of the present invention; Fig. 2 shows a section of cinematograph film showing the invention embodied in the general form or arrangement of film commonly known as standard cinematograph film; Fig. 3 is a view showing a section of a cinematograph film embodying another form of the present invention; Fig. 4 shows a section of a cinematograph film embodying still another form of the invention; and Fig. 5 shows a section of cinematograph film embodying another form of the invention.

In the present disclosure of my invention I show it carried out in connection with a film which is comparatively long and narrow, as the ordinary cinematograph film is, and which is of uniform width throughout, thus causing its edges 10 to be straight and parallel. In accordance with the present invention the surface or area of the film is divided into a continuous, or substantially continuous, picture or image area designated generally by the letter A, and a plurality of blank areas designated generally by the letter B. The picture area A can, and preferably does, extend to the edges 10 of the film and can, and preferably does, extend continuously throughout the length of the film. In the form of the invention that I prefer out of those I illustrate, and which I show in Fig. 1, the picture area A extends continuously completely across the film between the edges 10 and also extends continuously longitudinally of the film. In this particular form of the invention, however, the picture area A is laid out or is divided into a plurality of comparatively small areas 11, arranged in two series longitudinally of the film and side by side on the film. The two series of areas 11 are arranged longitudinally relative to each other so that areas are directly transversely arranged relative to each other as will be seen from inspection of the drawing. Each of these areas 11 is adapted to carry one complete picture. As far as this invention is concerned it is immaterial what sequence or order the pictures on the areas 11 are in. There may be independent series of pictures on each of the series of areas 11 or there may be a single series of pictures carried by or between the two series of areas 11. Adjacent areas 11 in both series join at or in lines 12, which extend transversely of the film and which I will hereinafter term the transverse edges of the areas 11. The images 11 are of such width that their outer edges 13, which extend, generally, longitudinally of the film, and which I will hereinafter call the outer longitudinal edges, are at the edges 10 of the film, while the inner edges 14 of the areas 11, which, like the edges 13, extend, generally, longitudinally of the film and which I will hereinafter call the inner longitudinal edges, of transversely opposite areas 11 join or come together, thus causing the picture area A to extend continuously across the film between the edges 10 thereof. In this particular form of the invention the transverse edges 12 of the areas 11 are straight and parallel, extending truly tranversely of the film. The outer longitudinal edges 13 of the areas 11 are curved so that their middle portions only are at the edges 10, while their end portions, which connect with the transverse edges 12, are spaced somewhat inwardly from the edges 10. The outer edges 13 are preferably evenly or regularly curved as shown in Fig. 1, although this is not essential as far as the present invention is concerned. From inspection of Fig. 1 it will be readily seen that the adjacent end portions of the edges 13 of adjacent areas 11 cause a space 15 to be formed or left between them and the edges 10. The spaces 15 are all equal in areas, are equally spaced on the film, and are comparatively long and narrow in their general configuration. In accordance with the invention these spaces 15 are blank and thus provide spaces at which or by which the film can be gripped, clamped, or carried or supported in any suitable manner. The spaces 15 being of uniform size and being equally spaced longitudinally of the film, make it particularly simple to provide a simple effective mechanism for properly engaging them. Further, spaces 15 at both sides or edges of the film, make it possible to effectively engage and support the film from both edge portions. The inner longitudinal edge 14 of each area 11 is curved like, but oppositely to, the outer longitudinal edge 13 of that area, as clearly shown in Fig. 1. With the picture areas 11 of the two series arranged directly opposite each other the middle or central portions of the inner longitudinal edges 14 of opposite areas will join or come together at the center of the film while the end portions of the inner longitudinal edges 14 of opposite areas 11 will be spaced somewhat apart as clearly illustrated in Fig. 1. With the picture areas 11 of the two series arranged directly opposite each other the middle or central portions of the inner longitudinal edges 14 of opposite areas will join or come together at the center of the film while the end portions of the inner longitudinal edges 14 of opposite areas 11 will be spaced somewhat apart as clearly illustrated in Fig. 1. The end portions of the edges 14 of opposite picture areas 11 thus being separated form spaces or areas 16 at the center of the film or at the inner corners of the areas 11, as clearly shown in Fig. 1. The spaces 16 are generally similar to the spaces 15, being the same length as the spaces 15, but differing from them in that they are just twice as wide. The spaces 16 may, like the spaces 15, be used to receive devices for supporting or engaging the film and being twice as wide as the spaces 15 permit of perforations or openings 18 being conveniently formed in them if the film is to be carried or moved by a sprocket or claw mechanism. In the practical carrying out of the invention the curvature of the longitudinal edges 13 and 14 is just sufficient to form spaces 16 which will receive the necessary perforations 18. In practice it is possible to provide spaces 16 of ample size and yet have the curvature of the longitudinal edges 13 and 14 of a comparatively long radius. It will be obvious, of course, that the longer the radius of the longitudinal edges 13 and 14 is the straighter the edges 13 and 14 will be and the nearer the areas 14 will approach perfect rectangles. For all practical purposes the longitudinal edges 13 and 14 can be curved substantially as shown in Fig. 1 without making the picture areas 11 a shape or configuration which is unsightly or even noticeably different from truly rectangular picture areas. It is well known that cinematograph films are exposed so that the center of action of each picture is as near as possible to the center of the picture area and that the edge portions of the picture area, and particularly the extreme corners thereof, very seldom are of importance.

From the foregoing description it will be obvious how the present invention provides a film which utilizes a greater portion of its area for picture area than ordinary films of this general character. Ordinary films carrying two longitudinal series of pictures side by side such as this film does have spaces extending the entire length of the film for perforations and also spaces extending the entire width of the film for purpose of supporting it. The present film has no space or area either for the purpose of supporting the film or for carrying perforations which extend any appreciable distance longitudinally of the film or which is of any great area. The present film has only blank spaces, as are necessary for proper and effective supporting and operation of the film. Further the blank spaces provided by the present invention are shaped and related so that they are particularly effective.

In the form of the invention that I illustrate in Fig. 2, the picture area A is divided into a plurality of picture areas 11ª which are arranged in a single continuous series longitudinally of the film, and which extend completely and continuously across the film from edge to edge. This particular form of the invention is of the same general type as that commonly known as common or standard film in that it has a single longitudinal series of picture areas 11ª. Adjacent picture areas 11ª are joined or come together at their transverse edges 12ª so that the picture area A extends continuously and uninterruptedly longitudinally of the film. The longitudinal edges 13ª of the picture areas 11ª are curved similarly to the longitudinal edges 13 in the form of the invention first described so that their middle portions are at the edges 10 of the film while their end portions join the transverse edges 12ª at points spaced somewhat inwardly from the edges 10. This forms spaces 15ª at the edge portions of the film which can be utilized for supporting the film and which can carry perforations 18ª if so desired. Although the spaces 15ª are comparatively long and narrow and extend longitudinally of the film, they do not form continuous longitudinal blank spaces at the edges of the film. From inspection of Fig. 2 of the drawings it will be readily understood how this form can be handled and operated in much the same manner as the ordinary standard form of film and it will be obvious how this particular film utilizes a far greater portion of its area for the picture area A than the ordinary or standard film. The blank spaces 15ª by which the film can be supported and which can be used to carry perforations are shaped and arranged in a manner which provides for the film being conveniently and effectively supported and operated even though they are individually of comparatively small area and even though their combined area is comparatively small relative to the picture area.

In Fig. 3 of the drawings I show the invention applied to or embodied in a film wherein the picture area A is divided into a plurality of picture areas 11ᵇ which are formed in two longitudinal series similar to the areas 11 in the form of the invention first described except that the areas 11ᵇ of the two series are staggered relative to each other or are not directly opposite each other as they are in the form of the invention first described. The transverse edges 12ᵇ of adjacent areas 11ᵇ in each of the series join or come together and are preferably straight and truly transverse of the film. From inspection of Fig. 3 it will be readily seen that the transverse edges 13ᵇ of the two series of areas 11ᵇ do not come opposite each other but are in the same staggered relation as the areas 11ᵇ of the two series of areas 11ᵇ. In this form of the invention, like the other two forms which have been described, the longitudinal edges 13ᵇ and 14ᵇ of the picture areas 11ᵇ are curved forming spaces 16ᵇ at the central portion of the film and spaces 15ᵇ at the edge portions of the film. For a given curvature of the longitudinal edges 13ᵇ and 14ᵇ the spaces 16ᵇ are considerably smaller than the spaces 15ᵇ as will be readily seen from inspection of Fig. 3. The spaces 16ᵇ are spaced and shaped to permit of the film being effectively supported at its middle portion while the spaces 15ᵇ enable the film to be effectively supported at the edge portions and also provide spaces for perforations 18ᵇ if perforations are desired. In this form of the invention, like in the other forms, the picture area A is comparatively large or great relative to the blank area formed by the spaces 16ᵇ and 15ᵇ and extends continuously longitudinally of the film and also continuously completely across the film from edge to edge. The middle portions of the longitudinal edges 13ᵇ of picture areas 11ᵇ being at the edges 10 of the film bring the picture area A to the extreme edges of the film while the longitudinal edges 14ᵇ of the picture areas 11ᵇ in joining or coming together as clearly shown in Fig. 3 cause the two series of picture areas 11ᵇ to be joined and thus cause the picture area A to be continuous completely across the film.

In the form of the invention which I illustrate in Fig. 4 the picture area A is divided into a plurality of picture areas 11ᶜ arranged or distributed on the film in the same manner as the areas 11 are distributed in the form of the invention first described but shaped or formed somewhat differently than the areas 11 in the form of the invention first described. In this form of the invention the outer longitudinal edges 13ᶜ of the picture areas 11ᶜ are at, or coincide with, the edges 10 of the film being straight and parallel with the edges 10. The transverse edges 12ᶜ of the areas 11ᶜ are straight at their middle portions 50 and are curved at their end portions 51. The middle portions 50 of the transverse edges 12ᶜ extend truly transverse of the film and those of adjacent areas 11ᶜ come together or coincide so that the picture area A is continuous throughout the length of the film. The end portions 51 of the transverse edges 12ᶜ being curved form spaces 15ᶜ at the edge portions of the film and spaces 16ᶜ at the middle portion of the film. The spaces 16ᶜ at the middle portion of the film are shaped very similar to the spaces 16 in the form of the invention first described, except that they are disposed transversely of the film rather than longitudinally of it. The spaces 15ᶜ are of the same general configuration as the spaces 15 in the form of the invention first described, as the spaces 15ᵃ in the form of the invention second described, and as the spaces 15ᵇ in the form of the invention third described, except that they are of different proportions than any of these spaces. From inspection of Fig. 4 it will be obvious how the spaces 15ᶜ and 16ᶜ permit of the film being easily and effectively supported, and it will be seen how perforations 18ᶜ can be arranged in either the spaces 15ᶜ or the spaces 16ᶜ or in both. This form of the invention is particularly noteworthy because the picture areas 11ᶜ are very nearly truly rectangular, falling short of being rectangular only in that the end portions 51 of their transverse edges are somewhat curved.

In Fig. 5 of the drawings I show a form of the invention wherein the picture area A is divided into a plurality of small picture areas 11ᵈ which form a single longitudinal series on the film and which extend completely across the film from edge to edge. The form of the invention differs from any of those hereinbefore described in that the carrying spaces 15ᵈ are formed by having only one edge of each of the areas 11ᵈ curved or specially shaped. I have shown the top transverse edge 12ᵈ of each area 11ᵈ curved so that its middle portion engages or contacts with the lower or straight transverse edge 12ᵈ of the next area 11ᵈ while its end portions are somewhat spaced from the end portions of the transverse edge engaged by it, thus forming the spaces 15ᵈ. This particular form of the invention provides a picture area 11ᵈ which is particularly sightly and artistic.

From the foregoing description it will be obvious how the present invention provides a cinematograph film more economical than films of this character heretofore proposed or used and still capable of being commercially and practically used. It will be understood that the present invention is not specifically limited to any particular form or sequence of pictures or images on the picture areas 11ᵇ nor in its broader aspects to any particular or specific arrangement or configuration of picture areas 11ᵇ. Broadly the invention provides picture areas of such shape or configuration as to be of maximum size and to leave ample supporting spaces. It is not important that the picture areas be of one specific shape, that they be specifically or peculiarly shaped at any certain part or parts, or that they have curved parts or edges as described throughout this disclosure. Results might be had by beveling or diagonally cutting parts of the picture areas away to leave blank spaces on the films, thus providing picture areas with no part or parts curved but which are still made in accordance with this invention.

Further, in view of my having described only typical embodiments of my invention, I do not wish to limit myself to the specific details hereinabove set forth, but wish to reserve to myself any changes or variations that may appear to those skilled in the art and that may fall within the scope of the following claims.

Having described my invention, I claim:

1. A cinematograph film having a picture area extending continuously longitudinally of it and continuously transversely of it to its edges, and a plurality of supporting areas in spaced relation longitudinally and transversely of it.

2. A cinematograph film having a picture area with portions extending to its edges and portions spaced from its edges forming a plurality of spaced supporting areas at each edge.

3. A cinematograph film having a picture area extending continuously longitudinally of it and completely across it, the picture area being divided into uniformly shaped areas each adapted to carry a picture, and which define areas by which the film can be supported.

4. A cinematograph film having a longitudinal series of picture areas each extending to an edge of the film and each having a corner portion shaped to leave a space on the film at an edge.

5. A cinematograph film having two continuous longitudinal series of picture areas abutting at the central portion of the film the ends of the picture areas being uniformly shaped to leave supporting areas at the central portion of the film.

6. A cinematograph film having two continuous longitudinal series of picture areas abutting at the central portion of the film and each extending to an edge of the film, the ends of the areas being substantially uniformly curved to leave longitudinally disposed supporting areas at the central portion of the film.

7. A cinematograph film having two continuous longitudinal series of picture areas abutting at the central portion of the film and each extending to an edge of the film, the areas being shaped to leave spaced supporting areas at the central portion of the film, and at the edge portion of the film.

8. A cinematograph film having two continuous longitudinal series of picture areas abutting at the central portion of the film and each extending to an edge of the film, the areas being shaped to leave perforation carrying supporting areas at the central portion of the film and supporting areas at the edges of the film.

9. A cinematograph film having two continuous longitudinal series of picture areas abutting at the central portion of the film the areas having substantially uniformly curved edge portions which form supporting areas at the central portion of the film.

10. A cinematograph film having two continuous longitudinal series of picture areas abutting at the central portion of the film the ends of the picture areas being curved to leave supporting areas at the central portion of the film.

11. A cinematograph film having two continuous longitudinal series of picture areas abutting at the central portion of the film the ends of the picture areas being outwardly curved to leave supporting areas at the central portion of the film.

In witness that I claim the foregoing I have hereunto subscribed my name this 8th day of April, 1921.

LLOYD BROWN.

Witness:
 VIRGINIA BERINGER.